(12) United States Patent
Owejan et al.

(10) Patent No.: US 8,865,359 B2
(45) Date of Patent: Oct. 21, 2014

(54) FUEL CELL HAVING IMPROVED THERMAL CHARACTERISTICS

(75) Inventors: Jon P. Owejan, Honeoye, NY (US); Paul D. Nicotera, Honeoye Falls, NY (US); Jason Adam Brodsky, Nashua, NH (US)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 12/843,943

(22) Filed: Jul. 27, 2010

(65) Prior Publication Data

US 2012/0028154 A1   Feb. 2, 2012

(51) Int. Cl.
*H01M 4/86* (2006.01)
*H01M 8/04* (2006.01)
*H01M 8/02* (2006.01)
*H01M 8/10* (2006.01)

(52) U.S. Cl.
CPC .......... *H01M 8/04156* (2013.01); *H01M 8/023* (2013.01); *H01M 4/8626* (2013.01); *Y02E 60/50* (2013.01); *H01M 8/04074* (2013.01); *H01M 2008/1095* (2013.01)
USPC .......................................... 429/433; 429/434

(58) Field of Classification Search
CPC .................................................. H01M 4/8626
USPC ................................................. 429/433, 434
See application file for complete search history.

(56) References Cited

U.S. PATENT DOCUMENTS

| | | | |
|---|---|---|---|
| 6,136,412 A | 10/2000 | Spiewak et al. | |
| 6,444,594 B1 | 9/2002 | Child et al. | |
| 7,229,944 B2 * | 6/2007 | Shao-Horn et al. | 502/182 |
| 7,419,740 B2 * | 9/2008 | Binder et al. | 429/479 |
| 2005/0271927 A1 * | 12/2005 | Breault | 429/40 |
| 2006/0057051 A1 | 3/2006 | Dai et al. | |
| 2007/0243430 A1 * | 10/2007 | Arisaka et al. | 429/19 |
| 2009/0098432 A1 | 4/2009 | Rosenberg et al. | |
| 2010/0216048 A1 * | 8/2010 | Braeuninger et al. | 429/483 |

FOREIGN PATENT DOCUMENTS

WO    2008040682 A  *  4/2008  ............. H01M 8/02

OTHER PUBLICATIONS

Teerstra, Peter. "Thermal Conductivity and Contact Resistance Measurements for Adhesives". IPACK2007-33026, ASME. accessed at https://sensorprod.com/news/white-papers/2007-07_tcc/wp_tcc-2007-07.pdf.*
Thermopedia.com "Thermal Contact Resistance" accessed at http://www.thermopedia.com/content/1188/.*
A. Stein et al., Advanced Materials, vol. 20. 1-29 (2008).
P. Kulkarni et al., Synthetic Metals, 159(3-4), 177-181 (2009).
C. Liang et al., Angewandte Chemie, vol. 116, 5909-5913 (2004).
Y. Deng et al., Chemistry of Materials, vol. 19, 3271-3277 (2007).

(Continued)

*Primary Examiner* — Alison Hindenlang
(74) *Attorney, Agent, or Firm* — BrooksGroup (57) ABSTRACT

One exemplary embodiment includes a fuel cell comprising a polymer electrolyte membrane sandwiched between an anode and a cathode, a gas diffusion layer disposed over each of the cathode and the anode, a gas flow distributor layer disposed over the gas diffusion layer on both the anode and cathode sides, and optionally a coolant plate disposed over the gas flow distributor layer. The thermal resistance of the combined gas diffusion layer and gas flow distributor layer on the anode and/or cathode side is sufficient to allow the cathode catalyst layer to operate at an elevated temperature to effectively evaporate water produced at the cathode.

20 Claims, 3 Drawing Sheets

(56) References Cited

OTHER PUBLICATIONS

A.Z., Weber et al., Journal of Power Sources, 168, 191-199 (2003).
Chinese Office Action dated Aug. 20, 2013; Applicant: GM Global Technology Operations LLC.; Application No. 201110211695.4; 10 pages.
Chinese Office Action dated Jun. 5, 2014; Applicant: GM Global Technology Operations LLC.; Application No. 201110211695.4; 9 pages.

* cited by examiner

FUEL CELL HAVING IMPROVED THERMAL CHARACTERISTICS

TECHNICAL FIELD

The technical field generally relates to fuel cells.

BACKGROUND

Electrochemical fuel cells using hydrogen and oxygen as reactant gases and a polymer electrolyte as the separator membrane are able to operate at high energy efficiency with virtually zero emission. In such fuel cells, water management has a significant impact on fuel cell performance. The polymer electrolyte membrane needs water to maintain a proper hydration level for sufficient ionic conductivity. On the other hand, water is produced on the cathode through the electrochemical reduction of oxygen. Water produced at the cathode is typically removed by evaporating into the gas flow channels next to the cathode. If the water is evaporated too slowly, however, the electrode will fill with liquid water (flood), preventing the reactant gas from reaching the catalyst in the cathode. Fuel cell reaction will slow down dramatically or stop completely if the cathode is flooded with water. During cold start or low temperature operation (such as in 0°-60° C. temperature range), the cathode is particularly prone to liquid water flooding.

US Patent Application Publication 20050271927 describes a method of forcing water to flow from the cathode to the anode by operating the cathode at a higher temperature than that of the anode. The cathode layer and the components of the cathode layer, such as the carbon, are manufactured to have higher thermal resistance.

A fuel cell typically includes a gas flow distributor plate which may have a single gas channel of serpentine design to maximize reactant gas contact with the electrode. The gas flow distributor plate also functions as an electric current collector and conductor in a fuel cell stack. A portion of the electricity generated by the fuel cell is lost to the internal electric resistances of the distributor plate. To minimize this parasitic energy drain, one typically seeks to maximize the contact area between the flow distributor plate and its neighboring components so that there is minimal electric contact resistance and thermal contact resistance. A solid plate material having high electrical conductivity is typically preferred.

SUMMARY OF EXEMPLARY EMBODIMENTS OF THE INVENTION

One exemplary embodiment includes a fuel cell comprising an anode, a cathode, a polymer electrolyte membrane sandwiched between the anode and the cathode, a gas diffusion layer disposed over each of the cathode and the anode, a gas flow distributor layer disposed over the gas diffusion layer on the anode and cathode sides, and optionally a coolant plate disposed over the gas flow distributor layer. The thermal resistance of the combined gas diffusion layer and gas flow distributor layer on the anode and cathode side is sufficient to allow the cathode catalyst layer to operate at an elevated temperature to effectively evaporate water produced at the porous cathode catalyst layer.

Another exemplary embodiment includes a method of improving fuel cell low temperature characteristics comprising: providing a fuel cell comprising a nanostructured thin film cathode having an electrode thickness of less than about 3 micrometer and a gas flow distributor layer that distributes a reactant gas to the anode and cathode; increasing the thermal resistance and/or the thermal contact resistance of the gas flow distributor layer, and allowing the temperature of the cathode catalyst layer to rise significantly above the dew point of the reactant gas to prevent water flooding at the cathode catalyst layer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
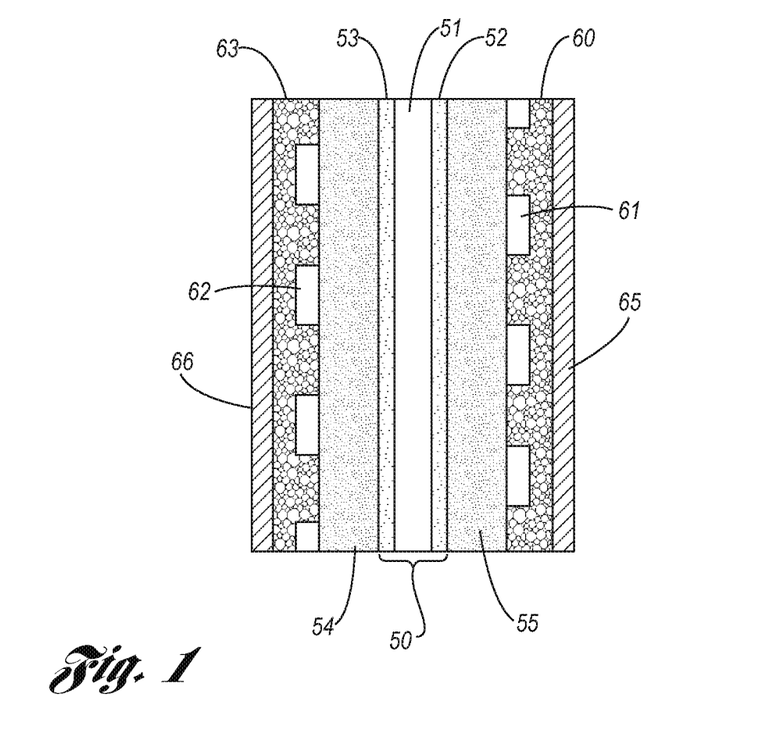
FIG. 1 is a schematic cross-sectional view of an exemplary fuel cell according to one embodiment.

FIG. 1 is a schematic cross-sectional view of a fuel cell according to one exemplary embodiment. A plurality of such units may be stacked together. Note that in this and other Figures, any layer thicknesses, pore sizes, or other features are not necessarily depicted to scale; e.g., some features may be depicted at an exaggerated scale for ease of illustration, and this is in no way intended to be limiting. The fuel cell may include a first gas flow distributor layer 60 and a second gas distributor layer 63, each including their respective reactant gas flow fields 61 and 62 defined by a plurality of lands separating reactant gas flow fields. The reactant gas flow fields effectively distribute either a fuel gas (such as hydrogen) to an anode or an oxidant gas (such as oxygen and air) to a cathode of the electrochemical fuel cell. The fuel cell may include a membrane electrode assembly 50 comprising a polymer electrolyte membrane (PEM) 51 comprising proton conductive moieties, an anode layer 53 and a cathode layer 52. A first gas diffusion layer (or gas diffusion medium) 55 may overlie the cathode electrode 52. A second gas diffusion layer 54 may overlie the anode layer 53. The gas diffusion layers 55 and 54 may each comprise a porous matrix layer and an optional second microporous layer as will be described later. If desired, a hydrophilic or hydrophobic layer (not shown) may be disposed on the cathode 52, anode 53, and/or the gas flow distributor layers 63 and 60. A first coolant plate 65 and a second coolant plate 66 are also included in this exemplary fuel cell to help remove excess heat generated during fuel cell operation for proper temperature control. The coolant plate is typically a thermally conductive plate, optionally having a coolant liquid disposed inside the plate. The coolant plate may be made of an electrically conductive material such as graphite, metal (such as aluminum and stainless steel), and metal alloys. The coolant inside the coolant plate may be circulated to a radiator for convective heat removal.

Polymer electrolytes may include hydrocarbon- and fluorocarbon-based resins. Hydrocarbon-based electrolyte resins can include phenolic, sulfonic acid, sulfoamide, aromatic ketone, carboxylic acid containing resins; condensation resins such as phenol-formaldehyde, polystyrene, styrene-divinyl benzene copolymers, styrene-divinylbenzene-vinylchloride terpolymers, and the like. Fluorocarbon-based polymer electrolytes can include perfluorinated sulfonic acid polymers such as tetrafluoroethylene-perfluorosulfonyl ethoxyvinyl ether tetrafluoroethylene-hydroxylated (perfluoro vinyl ether) copolymers, and sulfonated perfluorocyclobutane copolymers. In certain cases, fluorocarbon-type resins having sulfonic, carboxylic, sulfoamide, sulfonylimide and/or phosphoric acid functionality are also used. Fluorocarbon-based resins typically exhibit excellent resistance to oxidation by oxygen, peroxide, strong acids and bases, and can be used in neat and composite electrolyte membranes where a reinforcing non-electrolyte material such as a PTFE (polytetrafluoroethylene) orientated porous film or fiber matrix is used as mechanical framework. One family of fluorocarbon-type resins having sulfonic acid group functionality is the Nafion™ resins (DuPont Chemicals, Wilmington, Del., available from ElectroChem, Inc., Woburn, Mass., and Aldrich Chemical Co., Inc., Milwaukee, Wis.). Other fluorocarbon-based polymer electrolyte resins that can be useful in the invention comprise (co)polymers of olefins containing aryl perfluoroalkyl sulfonylimide cation-exchange groups. One such resin is p-STSI, an ion conductive material derived from free radical polymerization of styrenyl trifluoromethyl sulfonylimide (STSI) having the formula: styrenyl-$SO_2$—NH—$SO_2CF_3$. Polymer electrolyte having an equivalent weight (EW) of about 400 to about 1000 may be used to cast the electrolyte membrane in the fuel cell.

A polymer electrolyte membrane 51 can be cast or otherwise formed from a composition comprising the polymer electrolyte. The polymer electrolyte composition in a form of solution, dispersion, emulsion, polymer melt, particles blend, or neat liquid blend may be used to prepare the membrane. Depending on the form and specific composition of the mixture, various membrane formation methods known to an ordinary skill may be used. Non-limiting exemplary membrane formation methods may include extrusion through a slot die, solution casting, fixed gap coating, spray casting, dip coating, draw-down rod coating, calendaring, brushing, impregnation of a reinforcing sheet material and blow molding.

The fuel cell electrodes 52 and 53 (cathode and anode) may be a porous layer comprising a noble metal catalyst. The electrodes are in intimate contact with the membrane 51. The electrode may comprise catalyst support material, a noble catalyst, optionally an electric conductor and a resin binder. The electrode layer 52, 53 may be formed directly on the polymer electrolyte membrane 51 by a coating, spray, brushing, or other deposition method. The electrode 52, 53 can also be formed on a substrate support first and subsequently transferred onto the PEM. The noble metal catalyst generally comprises a platinum metal, platinum metal alloy or other noble metals. Non-limiting examples of metal catalyst may include platinum, ruthenium, manganese, palladium, nickel, iridium, iron, cobalt, and any alloys or mixtures thereof. Binary catalysts, such as alloys of Pt/Co, Pt/Ru, and Pt/Mn, may be employed. Ternary catalysts, represented by the general formula, PtM1M2 (solid solution of metals Pt, M1 and M2) may also be employed where Pt loading may be reduced. M1 and M2 represent two different metals other than Pt, such as: NiFe, CoFe, MnFe, NiMn, and CoMn metal pairs. In one example, a platinum catalyst is supported on a porous carbon black substrate (such as Vulcan XC-72 available from Cabot Corporation) held together by a PTFE binder. Such a porous electrode structure typically has a platinum loading of about 0.2 to 4 mg/cm$^2$ and a thickness of about 10-30 micrometers. The relatively large pore volume and the presence of hydrophobic PTFE binder make such electrodes less prone to water flooding—the formation of a liquid water layer on the surface of the catalyst. In another example, a low pore volume electrode layer, such as a nanostructured thin film (NSTF) layer, is used as the electrode layer. An NSTF based electrode layer enables lower platinum catalyst loading and low mass transfer overpotential with improved electrochemical stability and durability. An NSTF electrode layer typically has a thickness of 0.1 to 3 nanometers, 0.1 to 2 nanometers or 0.1-0.7 micrometer, and no PTFE binder or carbon particles are used. As a result, there is significantly less pore volume in the electrode, and the electrode layer is more prone to water flooding especially at cold start or low temperature operating conditions where low water vapor saturation pressure reduces the amount of water able to be removed in vapor phase. The NSTF fuel cell electrode layer is described in U.S. Pat. No. 6,136,412, which is incorporated herein by reference and briefly described below.

An NSTF electrode layer may be formed by depositing an array of nanostructured elements (typically in the shape of whiskers) of an organic material onto an initial microstructured support substrate. The nanostructured elements are subsequently transferred onto a PEM to form an electrode layer. A catalyst, such as Pt, Pt/Co alloy and PtMnCo alloy, is deposited on the array of nanostructured elements by physical vapor deposition or other known deposition methods.

The nanostructured element may comprise a whisker (or a metal coated whisker) of an organic material such as polynuclear aromatic hydrocarbons and heterocyclic aromatic compounds, most preferably C.I. (Color Index) PIGMENT RED 149 (perylene red or PR 149, available from American Hoechst Corp. of Somerset, N.J.). The crystalline whiskers have substantially uniform but not identical cross-sections, and high length-to-width ratios. The nanostructured whiskers are conformally coated with materials suitable for catalysis, and which endow the whiskers with a fine nanoscopic surface structure capable of acting as multiple catalytic sites. The length of each nanostructured element may be in the range from about 0.01 to 5, 0.1 to 2, or 0.1 to 1 micrometers. The nanostructured elements may be of uniform length. The average cross-sectional dimension of each nanostructured element may be less than about 1 micrometer, preferably 0.01 to 0.5 micrometers. Most preferably, the average cross-sectional dimension of each nanostructured element is in the range from 0.03 to 0.3 micrometers. The microstructures may have an areal number density in the range from about $10^7$ to about $10^{11}$ nanostructured elements per square centimeter. More preferably, the microstructures have an areal density in the range from about $10^8$ to about $10^{10}$ nanostructured elements per square centimeter. Furthermore, the high surface area of the nanostructured elements allows more catalyst to be deposited on the surface. The catalyst may be present at least about 80% by weight based on the combined weight of nanostructured elements and the catalyst. In comparison, an electrode layer based on a carbon black supported platinum catalyst typically has a catalyst loading of at most 40% based on the total weight of carbon and catalyst. Although the NSTF electrode layer has such a high catalyst weight percentage, the area density of the catalyst amount, a measure directly related to overall catalyst amount for a unit size fuel cell, is only about 0.05 to 0.1 mg/cm$^2$.

The nanostructured elements can be easily transferable from an initial substrate onto the polymer electrolyte membrane 51 or gas diffusion layer 54, 55 surface to form an electrode layer 52, 53. Any known transfer process may be used. A hot press, in batch or continuous line mode using nip rolls, belt, or compressing plates, may be used with or without pretreatment of the PEM or the initial substrate with a solvent, adhesive, binder, or other auxiliary materials. A pressure of between 90 and 900 MPa (mega-Pascal), more preferably between 180 and 270 MPa, may be used to press the initial substrate having deposited nanostructured elements against a polymer electrolyte membrane or a gas diffusion layer. The press temperature is between 80° C. and 300° C., and more preferably between 100° C. and 150° C. The pressing time may be greater than 1 second and preferably about one minute. The PEM and the initial substrate having the deposited nanostructured elements may be preheated for 1 to 10 minutes before being pressed together. The platens of the press may be water cooled or cooled by any other suitable means before the pressure is released and the initial substrate is removed. A press employing vacuum platens may optionally be used. The resulting NSTF electrode layer typically has thickness ranged from 0.1 to 3, 0.1 to 2, or 0.1 to 1 micrometer.

The gas diffusion layer 54, 55 may comprise an electrically conductive porous matrix and an optional microporous layer. The electrically conductive porous matrix may include, for example, a porous conductive foam (such as carbon foam, metal foam, . . . etc.), a conductive fiber matrix, or a conductive particle aggregate porous layer. A carbon fiber matrix may include at least one of carbon paper, carbon fiber nonwoven sheet, carbon fiber woven cloth, and carbon fiber knitted cloth. Commercial carbon cloth and paper materials are available from Zoltek, SGL group (with trade name Sigracet®) and Toray. A microporous layer may be interposed between the first porous matrix layer and the cathode electrode layer 52. The microporous layer may comprise an electrically conductive particle, a hydrophobic agent and optionally a polymer electrolyte. The microporous layer may provide proper pore sizes for gas permeation, water management and enhancement of intimate electric contact with neighboring catalyst of the electrode layer. The electrically conductive particle may include carbon particles and any other conductive inert materials such as noble metals and their oxides. Carbon particles may include Vulcan carbon (such as Vulcan XC-72), acetylene black, carbon nanotube, graphite, Black Pearls 2000, and Ketjen Black. The hydrophobic agent may include, but is not limited to, polymers and copolymers of vinylidene fluoride, tetrafluoroethylene, ethylene, propylene, and hexafluoropropylene. A solution or dispersion of polyvinylidenefluoride (PVDF), polytetrafluoroethylene (PTFE), or poly(tetrafluoroethylene-co-ethylene), for example, may be used as the hydrophobic agent.

Figure 2:
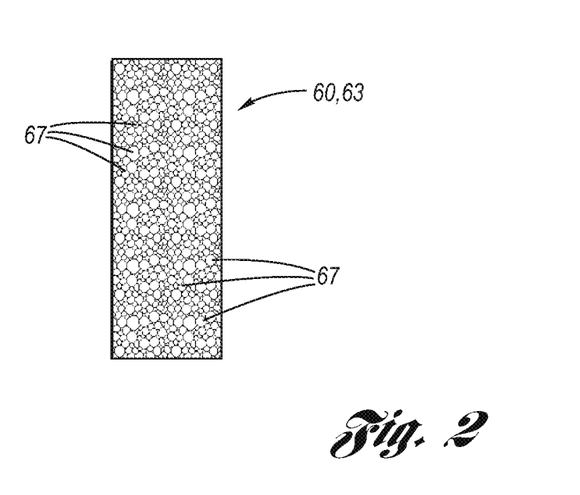
FIG. 2 illustrates an exemplary configuration of the gas flow distributor layer.
Figure 3:
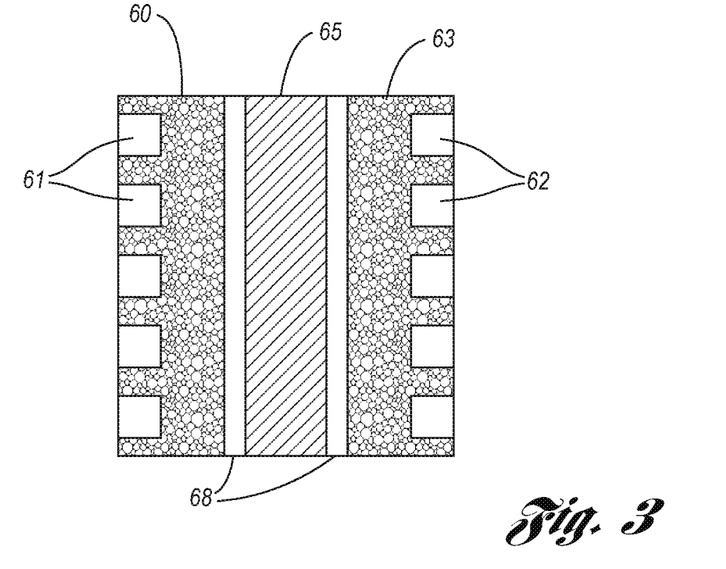
FIG. 3 illustrates an exemplary fuel cell component having two gas flow distributor layers and a coolant plate.

The gas flow distributor layer 60, 63 may comprise an electrically conductive material, such as graphite, carbon fiber composite, conductive carbon black composite, metal and/or metal alloy sheet. When metal or metal alloy sheet is used, the gas flow distributor layer may be produced by stamping a thin sheet of metal such as titanium, stainless steel, copper, nickel, chromium, gold, gold alloys, gold plated metal sheet and aluminum alloys to form a designed pattern of channels as the flow fields. Alternatively, the gas flow channels and patterns may be provided by molding, carving, etching or other similar processes known in the field. A gas flow distributor layer having relative high thermal resistance may be used according to one embodiment of the invention. For a sheet-like material, thermal resistance in the thickness dimension is herein defined as the thickness divided by the thermal conductivity. The thermal resistance has a unit of m$^2$–K/W (meter square Kelvin per watt). The gas flow distributor layer 60, 63 may have a thermal resistance in the thickness dimension of at least $10\times10^{-3}$, $1.5\times10^{-3}$, or $2.0\times10^{-3}$ m$^2$–K/W. Various levels of thermal resistance can be achieved by selecting different materials with different thermal conductivities and constructing the gas flow distributor layer in different thicknesses. In one configuration, the gas flow distributor layer 60, 63 has higher thermal resistance than the neighboring gas diffusion layer 55, 54. The gas flow distributor layer may be configured to have greater thickness than the gas diffusion layer, thus increasing the overall thermal resistance between the coolant plate 65 and the cathode 52. As shown in FIG. 2, an exemplary porous gas flow distributor layer such as 60 or 63 having voids 67 in the material may be used. The porous gas flow distributor layer has higher thermal resistance than the same solid material without the voids. Suitable porous materials may include, but are not limited to, porous graphite, carbon fiber composite, carbon particulate filled resin composite, or a metal foam material (such as stainless steel foam, nickel foam, aluminum foam, titanium foam, metal plated polymer foam, etc.). Note that while all of FIGS. 1-5 show gas flow distributor layers 60 and/or 63 with the same porous cross-hatch pattern, not all embodiments include a porous gas flow distributor layer; i.e., some embodiments include a non-porous or solid gas flow distributor layer. In another embodiment, portions of the gas flow distributor layer may be porous and other portions may be solid. In one configuration, the gas flow distributor layer and coolant plate are integrated into one fuel cell component as shown schematically in FIG. 3. The coolant plate 65 may be sandwiched between two gas flow distributor layers such as 60 and 63, one for distributing the fuel gas to the anode and one for the oxidant gas to the cathode. Impermeable separation layers 68 may also be included between the coolant plate 65 and each of the gas flow distributor layers 60 and 63. The distributor layers 60 and 63 each have their respective flow channels/fields 61 and 62. The flow channels/fields 61 and 62 may be of different designs or patterns. In another configuration, the gas flow distributor layer 60, 63 may have a thermal resistance gradient across the thickness dimension. The gas flow distributor layer may comprise multi-layers of materials with varying thermal conductivity, varying density of voids, or varying chemical compositions. As a result, the thermal resistance in the thickness dimension varies depending on the specific configuration. The gas flow distributor layer may have higher thermal resistance on the outside sections and lower thermal resistance in the middle section or vice versa. Additional examples of porous gas flow distributors include porous metal gold plated only on contacting surfaces, or porous material with conductive impermeable skin deposited on mating surfaces; interwoven metal wire mesh; ordered mesoporous carbon layers (CMK) and templated nanoporous carbons (TNC) such as resols, evaporation-induced self assembled (EISA) mesostructures (Advanced Materials 2008, A. Stein at al, v. 20, pp. 1-29), and block copolymer films with one sacrificial phase in a gyroid or orthogonal columnar morphology that volatilizes during pyrolysis (Synthetic Materials 2008, P. Kulkarni et al, In press; Angewandte Chemie 2004, C. Liang, v. 116, pp. 5909-5913; patent US2006057051A); carbon-epoxy composite or metal-coated glass fiber diffraction grating structures; and conductively coated or functionalized mesoporous silica compounds (Chemistry of Materials 2007, V. Deng at al, v. 19, pp. 3271-3277).

Figure 4:
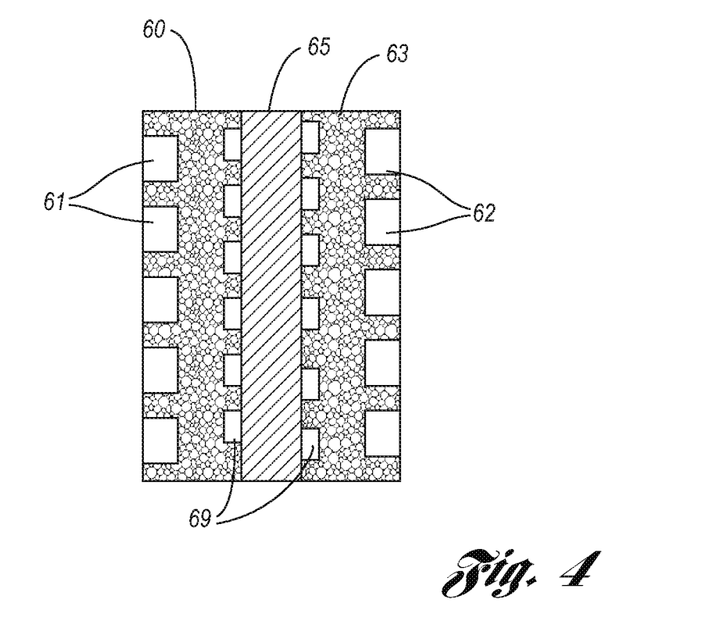
FIG. 4 illustrates another configuration of a fuel cell component having a coolant plate with two gas distributor layers.

The fuel cell may be configured to have a thermal contact resistance substantially greater than zero between the gas flow distributor layer 60, 63 and the gas diffusion layer 54, 55, and/or between the gas flow distributor layer 60, 63 and the coolant plate 65, 66. Thermal contact resistance is herein referred to as the temperature difference across an interface divided by heat transfer rate per unit area. Thermal contact resistance may be expressed mathematically as $\Delta T/(q/A)$, where $\Delta T$ is the temperature difference across the interface in degrees Kelvin, q is heat transfer rate in Watts, and A is interfacial area in $m^2$. The thermal contact resistance thus has a unit of $m^2$-K/W. The thermal contact resistance between the gas flow distributor layer 60, 63 and its neighboring component may be in the range of about 0.0001 to 0.005 $m^2$-K/W. The gas distributor layer may comprise a pattern of gas flow channels/fields having the characteristics of small size of protruded surface area for contacting with the neighboring gas diffusion layer 54, 55 or the coolant plate 65, 66. Such flow field characteristics result in small contact area between the gas flow distributor and the neighboring component(s), and thus higher thermal contact resistance. In one example, a rectangular like pattern of gas flow fields is created on the outside sections with narrow protruded borders between neighboring rectangular fields. Only a portion of the border section is able to have direct contact with a neighboring component. As a result, the gas flow distributor layer may have a direct contact area with its neighboring component at less than about half of the geometric overlap area with the neighboring component. In another example, a screen with rectangular like openings may be disposed on a plate-like component to form a gas flow distributor layer. The screen may be a conductive stainless steel or aluminum woven screen, or a metal coated resin screen. In yet another example, a coating with low thermal conductivity may be applied to the surface of the gas flow distributor layer, the gas diffusion layer and/or the coolant plate to increase the thermal contact resistance. The low thermal conductivity coating may be electrically conductive and have a thermal conductivity less than about 150, 50 or 30 W/m-K. Carbon or metallic coatings based on bronze (k=26), stainless steel (k=10-60), nickel steel (k=10-26), silicon steel, and chrome steel, as well as heat-expandable hollow or polymer-filled microspheres (U.S. Pat. No. 6,444,594) may be used as the thermal resistance coating. In yet another example, the contact surface of the gas flow distributor layer 60, 63 and/or the gas diffusion layer 54, 55 may be roughened such that the effective area of contact is substantially less that the geometric area of contact. The surface of contact layers may be roughened by sanding, etching, drilling, carving, or other similar chemical or mechanical methods known in the field. FIG. 4 illustrates another example of a fuel cell component having a coolant plate 65 with two layers of gas flow distributor layers, 60 and 63, disposed on both sides. There are characteristic patterns of gas flow channels, 61 and 62, in the outside sections of the gas flow distributor layers. There are also channels, void, or recessed sections shown as numeral 69 between the coolant plate 65 and the gas flow distributor layers 60, 63. Numeral 69 may be a part of the gas flow distributor layer or part of the coolant plate. The channels, void, or recessed sections in 69 reduce the contact area between the gas flow distributor layers and the coolant plate, reduce plate pressure drop and thus increase the thermal contact resistance. Another example of spatial variation includes a thin dielectric material on one or more surfaces of the coolant plate and/or the gas flow distributor layer.

Figure 5:
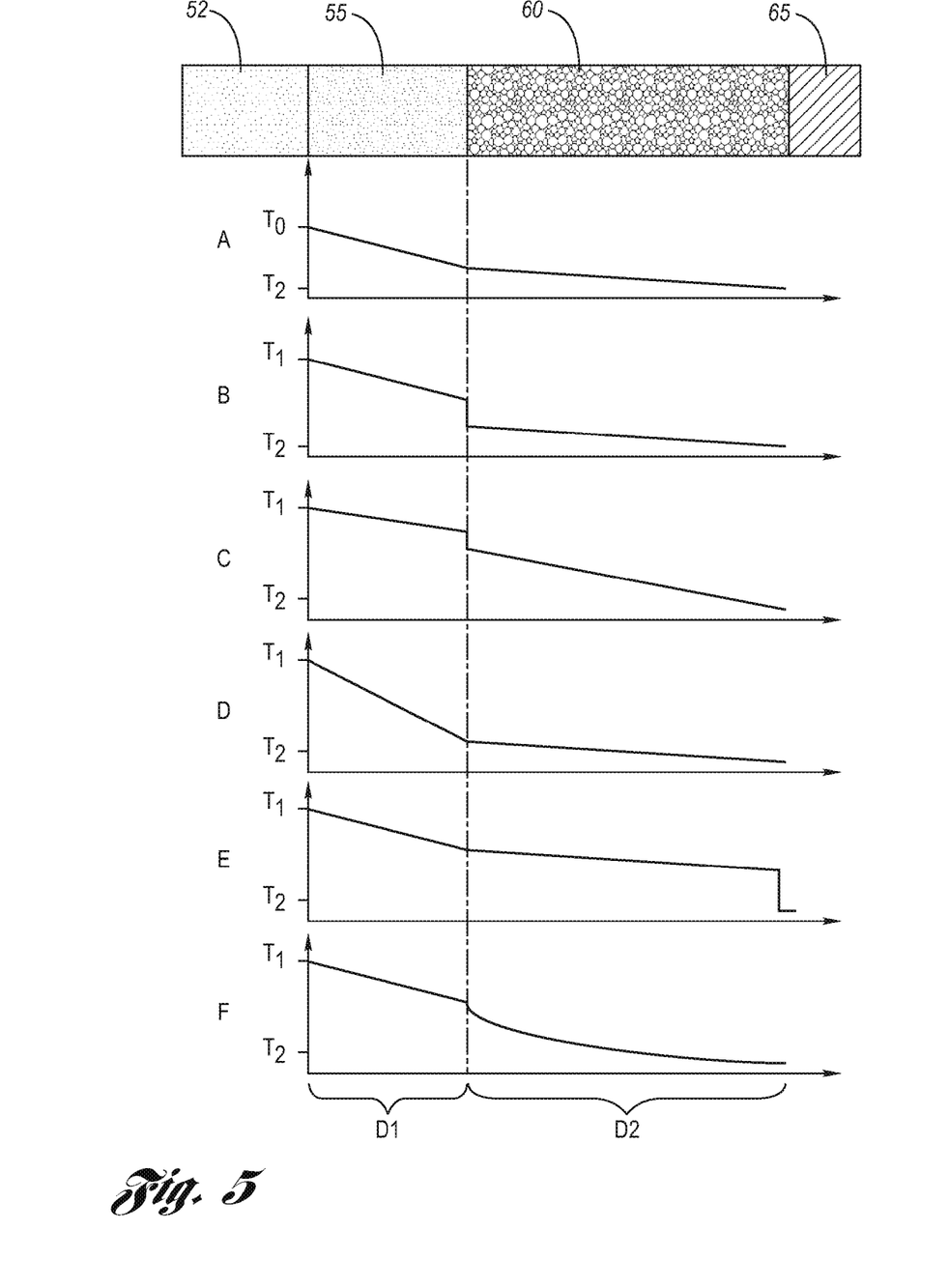
FIGS. 5A-F show several exemplary temperature profiles across the gas diffusion layer and the gas flow distributor layer.

Different embodiments of the invention may produce different characteristic temperature profiles in the gas diffusion layer and gas flow distributor layer on the cathode side and/or the anode of the fuel cell. In particular, the high thermal resistance and/or contact resistance of a fuel cell component may cause the cathode catalyst layer and/or the anode catalyst layer to operate at an elevated temperature relative to the reactant gas temperature especially in cold start or low temperature environment. The cathode catalyst layer and/or anode catalyst layer may be operating at a temperature 1 to 15 K higher than the dew point of inlet reactant gas. The cathode catalyst layer may be able to run with higher vapor transfer flux at cold start or low coolant temperature condition (0° C.-40° C.). Several exemplary temperature profiles of the combined gas diffusion layer and gas flow distributor layer are illustrated in FIG. 5. When a solid conventional gas flow distributor layer 60, 63 is used in a hydrogen fuel cell with substantially reduced contact resistance, the temperature profile across the thickness dimension may be represented by plot (A) in FIG. 5 as a comparative example, where T0 is the surface temperature of the cathode 52 and T2 is the surface temperature of the coolant plate 65. When the thermal contact resistance between the gas diffusion layer 55 and gas flow distributor layer 60 is made substantially greater than zero as described earlier, there is a significant temperature drop across the interface as represented by plot (B) in FIG. 5. If the temperature of the coolant plate and other fuel cell operating conditions are kept the same, the surface temperature of the cathode 52, will be raised to T1, where T1 is greater than T0.

A raised temperature at the cathode catalyst layer, especially in cold start or low operating temperature environments, increases water evaporation rate and effectively prevents water flooding at the cathode catalyst layer. When the thermal resistance of the gas flow distributor layer is increased, for example, by using a porous electrical conductor, the temperature profile may be represented by the plot (C). The increase in thermal resistance in the gas flow distributor layer results in a higher slope of the temperature profile in the thickness dimension D2. As a result, the cathode temperature is raised to T1. In a similar manner, the thermal resistance of the gas flow diffusion layer 55 may also be increased, resulting in higher slope of the corresponding temperature profile in the thickness dimension D1 as shown in plot (D) in FIG. 5. The cathode temperature is thus increased to T1 accordingly. Plot (E) in FIG. 5 illustrates the effect of increasing the thermal contact resistance between the gas flow distributor layer 60 and the coolant plate 65. A significant temperature drop across the interface results, which allows the cathode to operate at an elevated temperature T1. Plot (F) in FIG. 5 illustrates the effect of having a gas flow distributor layer 60 with variable thermal conductivity in the thickness dimension. The thermal conductivity decreases across the thickness dimension from the coolant plate interface to the gas diffusion layer interface. As a result, the temperature profile in the thickness dimension D2 exhibits a bending curve shape, and the cathode temperature is also raised as a result. The actual solution is a combination of (B) through (F)

EXAMPLE

Three different gas flow distributor layers having different thermal resistance are used in a unit hydrogen fuel cell similar to that shown in FIG. 1. The fuel cell has a sulfonated fluoropolymer electrolyte membrane (3M membrane) sandwiched between an NSTF anode catalyst layer and a NSTF cathode catalyst layer. The NSTF electrode is free of carbon and has a thickness of about 0.5-0.7 micrometer. Each of the electrode layers includes a PtMnCo ternary catalyst deposited on whisker geometry. A non-woven carbon fiber paper with a microporous layer is used as the gas diffusion layer. The fuel cell is operated at 150 kPa gas pressure. To measure the effect of thermal resistance on fuel cell performance at lower operating temperatures (45° C. and 55° C.), current densities at 0.4V cell voltage at optimized conditions are obtained and compared. The results are summarized in Table 1.

TABLE 1

Effect of Thermal Resistance on Fuel Cell Performance.

| Gas Flow Distributor Layer | Thermal Resistance ($m^2K/W$) | Current density at 45° C., dry gas ($A/cm^2$) | Current density at 55° C., 40% RH ($A/cm^2$) |
|---|---|---|---|
| #1 | $0.8 \times 10^{-3}$ | 0.19 | 0.22 |
| #2 | $1.5 \times 10^{-3}$ | 0.24 | 1.3 |
| #3 | $2.7 \times 10^{-3}$ | 0.51 | 1.9 |

All cells have an NSTF catalyst layer and 3M membrane. Configuration #1 has a standard anode and cathode flow distributor (directly connected to coolant layer) with a GDL that has a standard thermal resistance (MRC 105) [(A) from FIG. 5]. Configuration #2 has gold plated stainless steel mesh gas distributors and a GDL with a standard thermal resistance [(C) from FIG. 5]. Configuration 3 has gold plated stainless steel mesh gas distributors with a GDL that has high thermal resistance [(C)+(D) in FIG. 5].

As shown in Table 1, at a threshold operating temperature, a slight increase in current density values among the 3 different gas flow distributor layers is observed. As operating temperature increases, however, configuration #1 produces a much lower current density compared to configurations #2 and #3. Since the hydrogen fuel cell has an open circuit voltage of between 0.9 and 1 volt, current density at 0.4 volt is typically determined by the rate of the mass transfer of reactant gas/rate of water evaporation to prevent water flooding. Mass transfer rates are clearly improved with increased thermal resistance. The low current density in configuration #1 is attributed mostly to water flooding. The improvement of configuration #2 and particularly configuration #3 over #1 at 55° C. are due to increased thermal resistance that allows the cathode catalyst layer to operate at a higher saturation pressure resulting in more of the produced water being removed in the vapor phase.

The above description of embodiments of the invention is merely exemplary in nature and, thus, variations thereof are not to be regarded as a departure from the spirit and scope of the invention.

What is claimed is:

1. A product comprising a fuel cell, said fuel cell comprising an anode, a cathode, a polymer electrolyte membrane sandwiched between said anode and said cathode, a gas diffusion layer disposed over each of said cathode and said anode, a gas flow distributor layer disposed over said gas diffusion layer on said anode and cathode sides, and an inlet reactant gas having a dew point and being provided to the gas flow distributor layer, wherein the thermal resistance of the gas flow distributor layer disposed over at least one anode or cathode is sufficient to allow said cathode to operate at an elevated temperature of 1 to 15K above the dew point to effectively evaporate water produced at said cathode and wherein the cathode layer comprises a nanostructured thin film comprising an array of whiskers comprising a polynuclear aromatic hydrocarbon or heterocyclic aromatic compound; wherein the cathode layer has a thickness in the range of 0.1 to 3 microns.

2. A product as set forth in claim 1, wherein said thermal resistance is at least $1.5 \times 10^{-3}$ $m^2K/W$.

3. A product as set forth in claim 1, wherein said thermal resistance is at least $2 \times 10^{-3}$ $m^2K/W$.

4. A product as set forth in claim 1, the nanostructured thin film cathode layer comprising an array of nanostructured elements of organic material and a noble metal catalyst.

5. A product as set forth in claim 4, wherein said cathode is substantially free of carbon black.

6. A product as set forth in claim 4, wherein the thickness of said cathode layer is between about 0.1 micrometer and 2 micrometer.

7. A product as set forth in claim 4, wherein the thickness of said cathode layer is between about 0.1 and 1 micrometer.

8. A product as set forth in claim 1, wherein said gas flow distributor layer comprises substantially a porous material having voids inside said material; and the thermal resistance of said porous material is higher than that of said material without said voids; and wherein said product further comprises an optional coolant plate that is separated from said porous material by an impermeable separator layer.

9. A product as set forth in claim 8, wherein said material comprises metal plated polymer foam, graphite, carbon fiber composite, carbon black filled composite, carbon nanotube, aluminum alloy, copper alloy, stainless steel, titanium, titanium alloy, gold, nickel, nickel alloy, gold alloy or any combination thereof.

10. A product as set forth in claim 8, wherein there is a channel, void, thin dielectric material or recessed section between the gas flow distributor layers and the coolant plate to effectively increase the contact resistance between said gas flow distributor layer and said coolant plate.

11. A product as set forth in claim 10, wherein said contact area between said gas flow distributor layer and said coolant plate is substantially less than the overlapped cross-sectional area of said gas flow distributor layer with said coolant plate.

12. A product as set forth in claim 1, wherein said gas flow distributor comprises a mesh flow field defining a rectangular like pattern of gas flow channels, and only a portion of said rectangular like pattern is in direct contact with said neighboring gas diffusion layer.

13. A product as set forth in claim 12, wherein less than half of said rectangular patterns are in direct contact with said neighboring gas diffusion layer.

14. A product as set forth in claim 1, where said gas flow distributor layer comprises a mesh screen.

15. A product as set forth in claim 14, wherein said gas flow distributor layer comprises a roughen surface in direct contact with said gas diffusion layer, and the effective area of contact is substantially less that the geometric area of contact.

16. A product as set forth in claim 1, wherein the contact thermal resistance between said gas diffusion layer and said gas flow distributor layer is in the range of about 0.0001 to 0.005 $m^2$-K/W.

17. A product as set forth in claim 16, wherein a coating layer having a thermal conductivity less than that of said gas flow distributor layer and/or said gas diffusion layer is disposed between said gas diffusion layer and said gas flow distributor layer.

18. A product as set forth in claim 1, wherein thermal conductivity of said gas flow distributor layer varies across the thickness dimension of said distributor layer.

19. A product comprising: a fuel cell comprising a gas flow distributor for distributing a reactant gas in a fuel cell, the gas flow distributor having a thermal resistance of at least $1.5 \times 10^{-3}$ m$^2$K/W to effectively allow the cathode layer to operate at a temperature of 1 to 15K higher than the dew point of the inlet reactant gas and a cathode layer comprising a nanostructured thin film comprising an array of whiskers comprising a polynuclear aromatic hydrocarbon or heterocyclic aromatic compound; wherein the cathode layer has a thickness in the range of 0.1 to 3 microns.

20. A product comprising a fuel cell comprising a gas diffusion media layer, a cathode layer comprising a nanostructured thin film comprising an array of whiskers comprising a polynuclear aromatic hydrocarbon or heterocyclic aromatic compound and having a thickness in the range of 0.1 to 3 microns, a gas flow distributor layer comprising a porous material disposed over the gas diffusion layer and configured to distribute a reactant gas provided from a reactant gas inlet to the surface of the cathode layer, and a coolant plate, wherein the gas flow distributor layer has at least an impermeable barrier layer between the coolant plate and the porous material or an impermeable conductive skin deposited on the mating surface with the gas diffusion layer, and the gas flow distributor layer has a thermal resistance of at least $1.5 \times 10^{-3}$ m$^2$K/W to effectively allow the cathode layer to operate at a temperature of 1 to 15K higher than the dew point of the inlet reactant gas.

\* \* \* \* \*